(12) United States Patent
Saghian

(10) Patent No.: US 7,645,184 B2
(45) Date of Patent: Jan. 12, 2010

(54) CD REPAIR APPARATUS

(76) Inventor: Farzad Saghian, 15210 Keswick St., Van Nuys, CA (US) 91405

( * ) Notice: Subject to any disclaimer, the term of this patent is extended or adjusted under 35 U.S.C. 154(b) by 27 days.

(21) Appl. No.: 12/004,317

(22) Filed: Dec. 19, 2007

(65) Prior Publication Data

US 2009/0163116 A1 Jun. 25, 2009

(51) Int. Cl.
*B24B 7/10* (2006.01)
(52) U.S. Cl. .............. 451/63; 451/54; 451/359
(58) Field of Classification Search ......... 451/287, 451/290, 63, 54, 59, 359, 398
See application file for complete search history.

(56) References Cited

U.S. PATENT DOCUMENTS

| 4,738,870 | A | * | 4/1988 | Green et al. ................. 427/518 |
| 5,102,099 | A | * | 4/1992 | Brown et al. ................. 451/283 |
| 5,584,089 | A | * | 12/1996 | Huang ......................... 15/97.1 |
| 6,261,159 | B1 | * | 7/2001 | Krieg et al. ................... 451/63 |
| 6,386,946 | B1 | * | 5/2002 | Lin et al. ......................... 451/7 |
| 6,609,959 | B2 | * | 8/2003 | Takahashi et al. ............. 451/65 |
| 6,846,228 | B2 | * | 1/2005 | Lin ............................ 451/290 |
| 7,104,871 | B1 | * | 9/2006 | Kennedy ...................... 451/41 |

* cited by examiner

*Primary Examiner*—Robert Rose
(74) *Attorney, Agent, or Firm*—Michael N. Cohen; Law Office of Michael N. Cohen, P.C.

(57) ABSTRACT

An apparatus for the repair and resurfacing of compact discs using a motorized, abrasive surface.

6 Claims, 5 Drawing Sheets

CD REPAIR APPARATUS

BACKGROUND OF THE INVENTION

The present invention relates to an apparatus for the repair of surface scratches from laser scanned, digitally encoded storage discs, commonly known as compact discs. Because compact discs are frequently handled and mishandled by users, surface scratches are a common occurrence. Such surface scratches may interfere with the ability of optical scanning devices to read and retrieve data stored on discs, resulting in the inability to access stored data and information.

The present invention addresses problematic surface scratches using abrasive agents for the removal of surface scratches and resurfacing of compact discs. While abrasive removal of scratches on compact discs can be an effective means of salvaging damaged compact discs, it is imperative that abrasive removal is conducted while the repaired compact disc maintains a parallel or substantially parallel position. Otherwise, the compact disc may be damaged further by contact with the abrasive agents.

While there are apparatuses in the prior art that employ abrasive means of repairing compact discs, none have provided satisfactory means of ensuring that the compact discs being repaired maintain a parallel or substantially parallel position against an abrasive surface. U.S. Pat. No. 5,102,099 titled "Disc Repair Apparatus" attempts to address the problem of maintaining optimal positioning of the compact disc being repaired by providing a three abrasive pad system, with each of the pads placed at an angle. This is a costly and complex means to address the problem, requiring more maintenance and replacement of parts, since three abrasive pads must be maintained and three means to rotate said abrasive pads must be provided. Further, prior machines utilizing straight shaft springs typically jam as well as the lid jamming as a result of the CD descending on the cleaning or abrasive pads at an angle.

Therefore, it is an object of the present invention to provide an improved apparatus for removal of surface scratches from compact discs using abrasive means.

It is an additional object of the present invention to provide an apparatus that allows for the rapid removal of compact disc scratches.

It is a further object of the present invention to provide an apparatus that ensures a parallel or substantially parallel position of a compact disc being repaired when making contact with an abrasive surface.

It is also an object of the present invention to teach an apparatus for the removal of compact disc scratches with minimal parts for maintenance.

SUMMARY OF THE INVENTION

The present invention relates to an apparatus for the removal of surface scratches that may be present on compact discs. The apparatus comprises a plate on which a compact disc rests. The plate includes a removable clasp, for attachment of a compact disc to the metal plate. A multiple arm unit secures the metal plate to a spring, which is in turn attached to a lid of a housing unit. The multiple arm unit is also attached directly to the lid of the housing unit. Abrasive pads or sheets of varying grades of surface material are attached to a motorized shaft and all are contained within the housing. When the lid of the housing unit is in a closed position, the motorized shaft may be powered on so that the abrasive pads/sheets rotate against the surface of the compact disc being repaired. Conditioning solvents may be applied on the abrasive pads to further enhance the repair process.

DETAILED DESCRIPTION OF THE INVENTION

Figure 1:
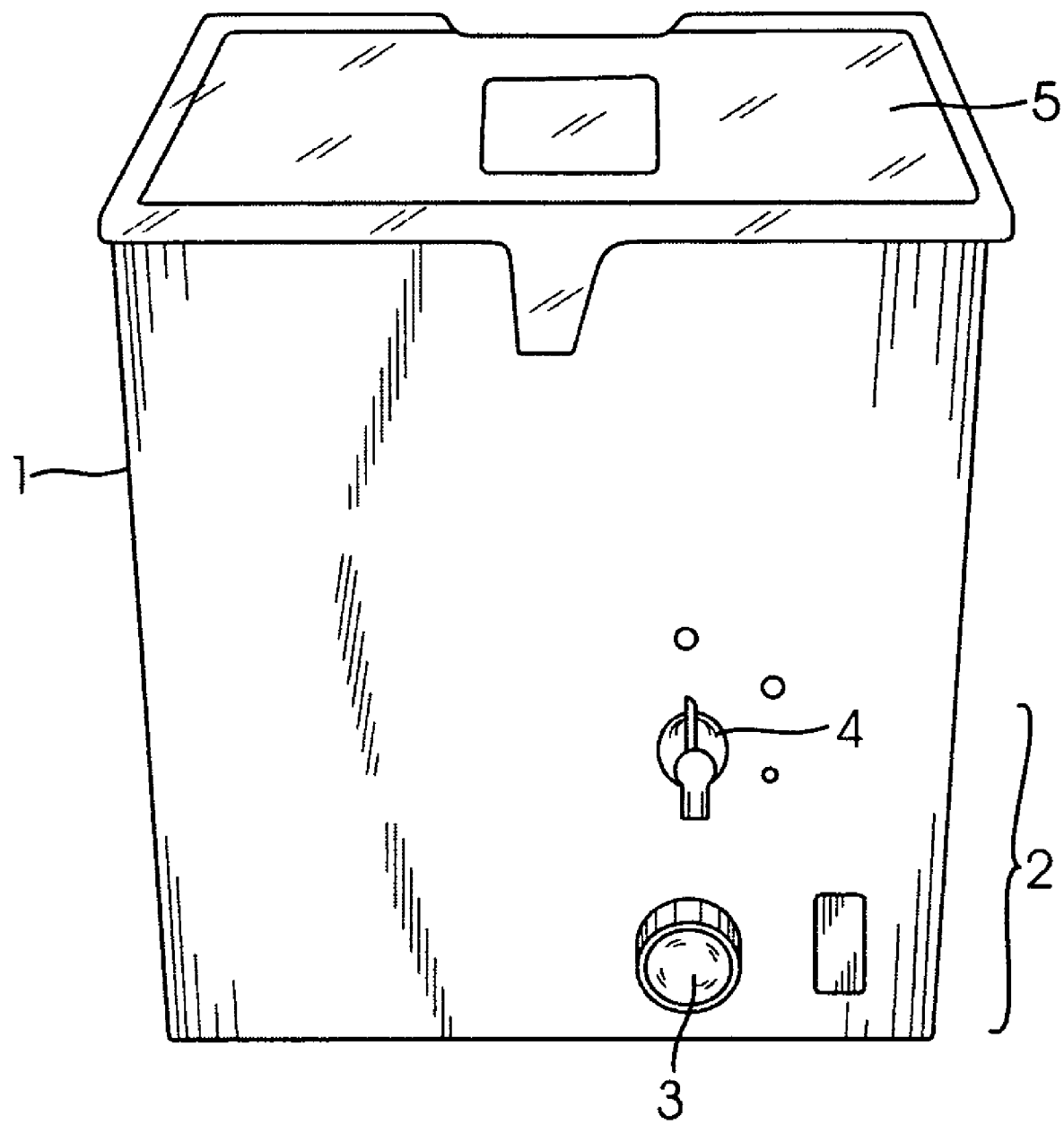
FIG. 1 shows the CD repair apparatus with a lid in a closed position.

FIG. 1 shows a perspective view of the exterior housing 1 of the CD repair apparatus. The housing may be constructed from any rigid and durable material including metal or plastic. In the preferred embodiment of the invention, the housing is constructed from plastic. A control panel 2 comprises a power switch 3 and a dial 4 for designation of time for which a compact disc is to be resurfaced. A lid 5 allows for access to internal components of the CD repair apparatus. The lid is in a closed position when the apparatus is in operation and when the apparatus is not being used.

Figure 2:
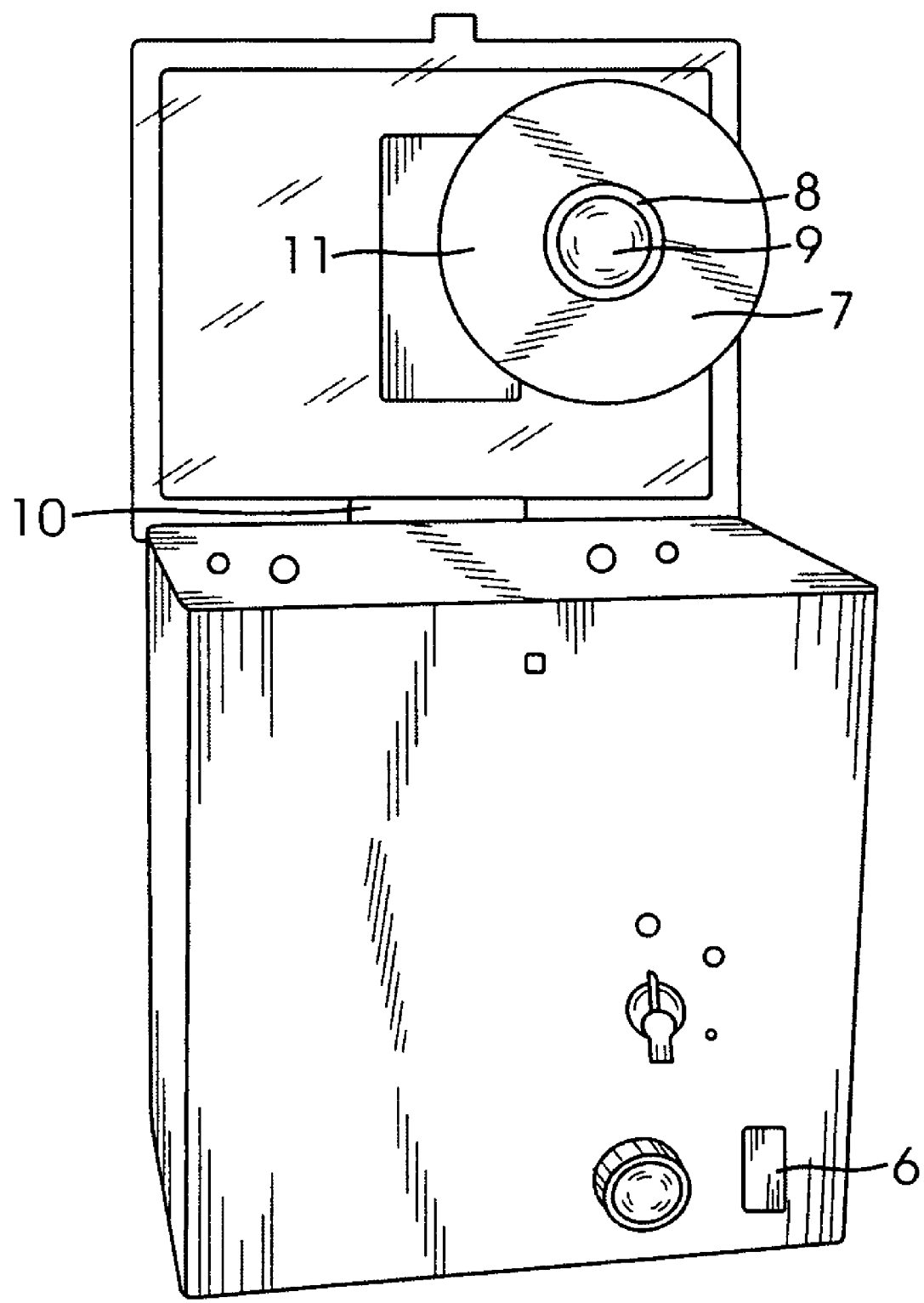
FIG. 2 shows the CD repair apparatus with the lid in an open position.

FIG. 2 depicts the CD repair apparatus with the lid in an open position. With the lid in an open position, the apparatus should not be running. A power light 6 may be provided for indication of whether an internal motor (not shown) is powered "on" or "off". A compact disc 7 is placed on top of a plate 8 and secured in position by a removable clasp 9. The lid may comprise a hinged unit 10 for frequent opening and closing of the lid. Most compact discs comprise a label side and a side intended for reading by an optical scanner 11. The side of the compact disc that is read by an optical scanner should be facing the user.

Figure 3:
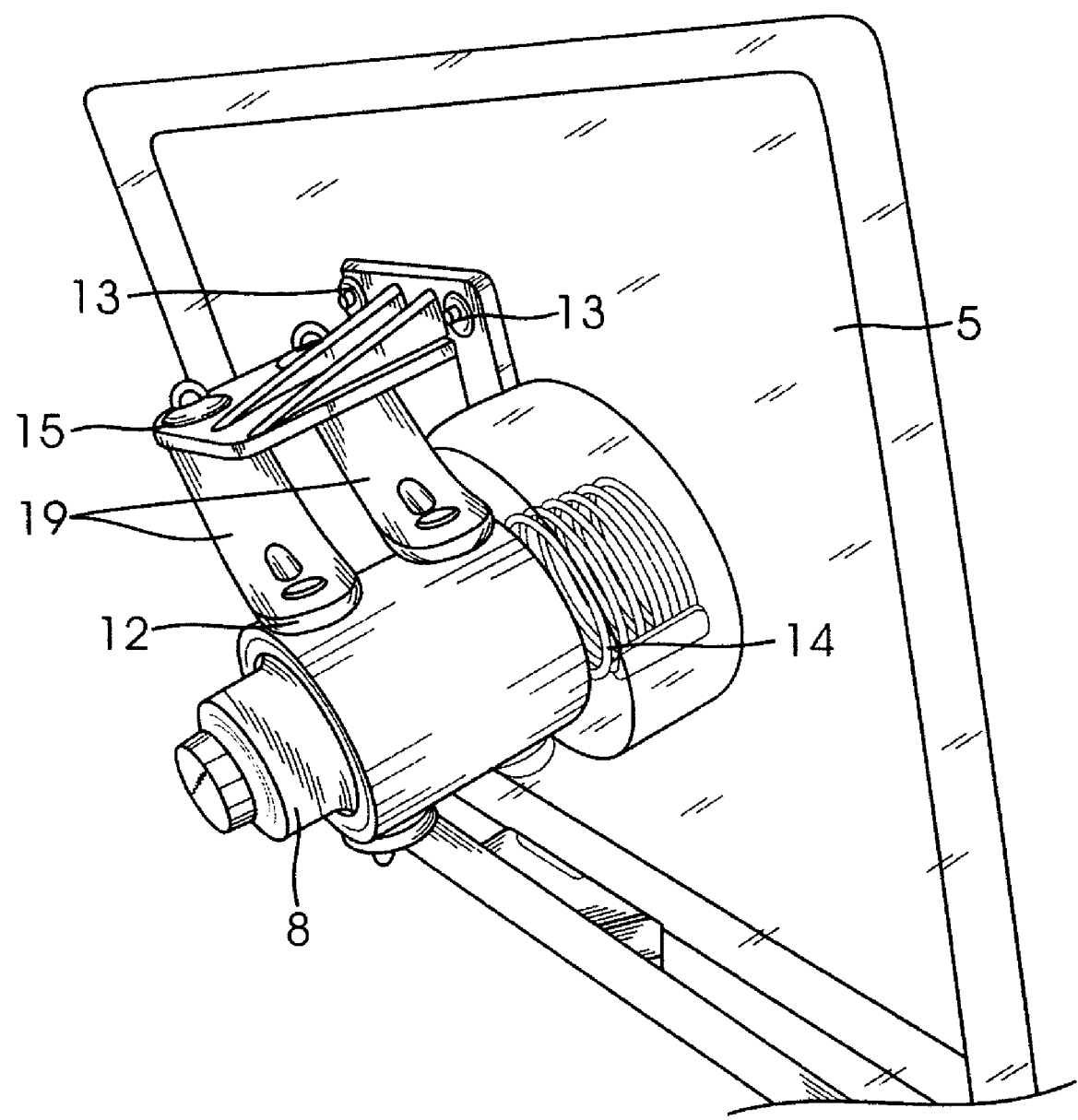
FIG. 3 shows a close-up, perspective view of the lid of the CD repair apparatus.

FIG. 3 illustrates a close up view of the lid 5. An arm unit 12 is attached to the lid via screws 13 or other attachment means. In the preferred embodiment the arm unit comprises multiple appendages. The arm unit is also attached to the lid through a spring 14. The arm unit comprises a joint 15 that allows for movement of the plate 8 when tension is received from the spring. In the preferred embodiment of the invention the multiple arm unit may shift the plate approximately 1/10th of an inch and the spring may move 0.75 inch, however the scope of the invention is not intended to be limited to these lengths but rather should vary according to internal dimensions of the housing and accompanying parts.

The spring and arm unit play an important role in the functioning of the apparatus because they allows for optimal orientation of the compact disc being repaired so that it assumes a parallel or substantially parallel position against an abrasive pad or sheet (not shown) while being resurfaced.

Furthermore, the spring in conjunction with the arm unit allows for the lid with the compact disc to be closed without the compact disc resting at an angle against an abrasive pad contained within the housing of the apparatus. Rather, when the lid is closed, the compact disc rest parallel or substantially parallel against the abrasive pad. This is an important capability of the apparatus because if the compact disc does not rest parallel or substantially parallel against the abrasive pad or sheet there is risk of further damaging the compact disc.

Figure 4A:
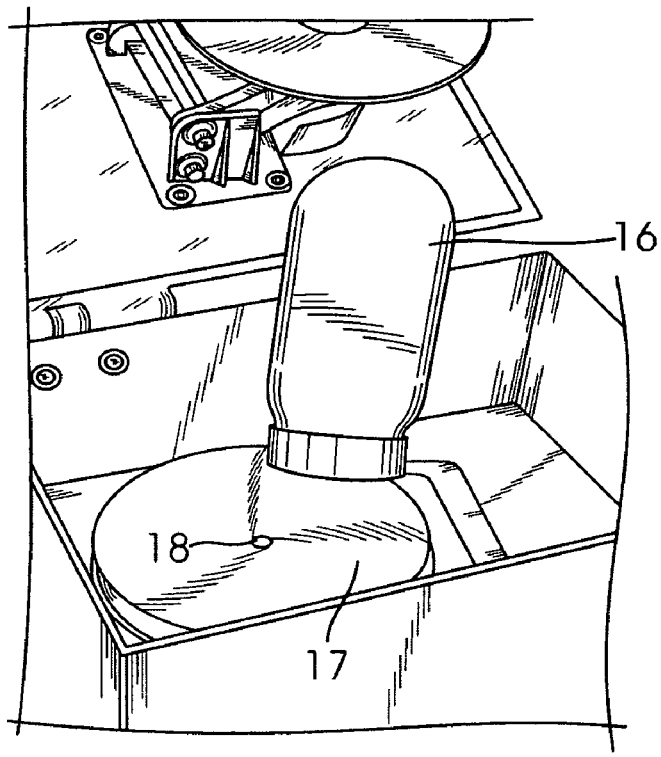
FIG. 4A shows a perspective view of an abrasive pad component of the apparatus and conditioning solvent being applied to it.

FIGS. 4A-4D show the apparatus in preparation for operation. In FIG. 4A a conditioning solvent known in the art 16 is applied to an abrasive pad 17 to enhance the resurfacing capability of the apparatus. The abrasive pad comprises an opening that allows for attachment to a shaft 18 that is in turn connected to a motor known in the art (not shown). When the motor is powered on, the shaft rotates in a horizontal direction, resulting in horizontal rotation of the abrasive pad. When the abrasive pad rotates against the surface of a compact disc, grooves formed by surface scratches impairing the compact disc may be removed so that data may again be retrieved. The motor may be powered by battery or by AC electric power.

Figure 4B:
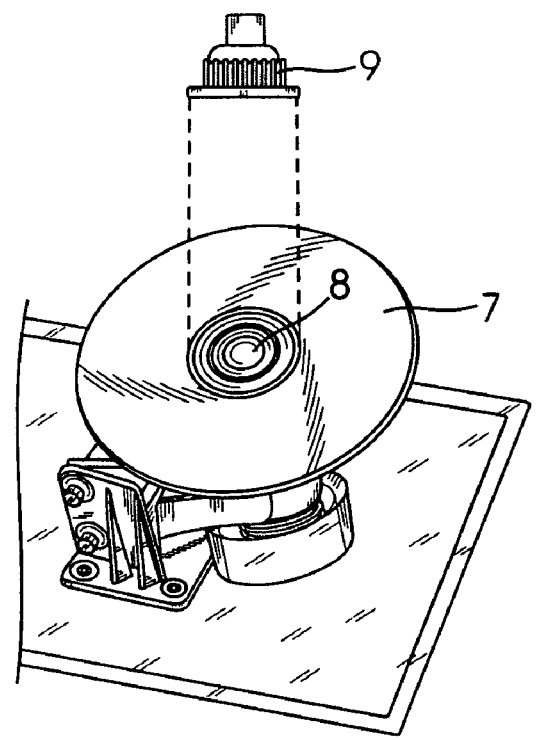
FIG. 4B shows the placement of a compact disc on an arm unit.

In FIG. 4B a compact disc 7 is positioned on the plate 8 by removal of the removable clasp and placement of the compact disc above the plate. The side of the compact disc that is read by an optical scanner 11 should be facing the user.

Figure 4C:
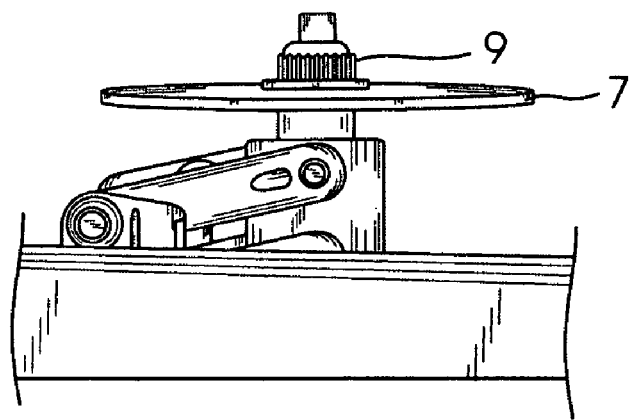
FIG. 4C shows a side planar view of the compact disc positioned on the arm unit and secured by a removable clasp.

In FIG. 4C the removable clasp 9 is reattached to the plate enabling the compact disc 7 to be secured to the plate. When properly installed in position, the compact disc should be securely held above the plate and unable to move in either a horizontal or vertical direction.

Figure 4D:
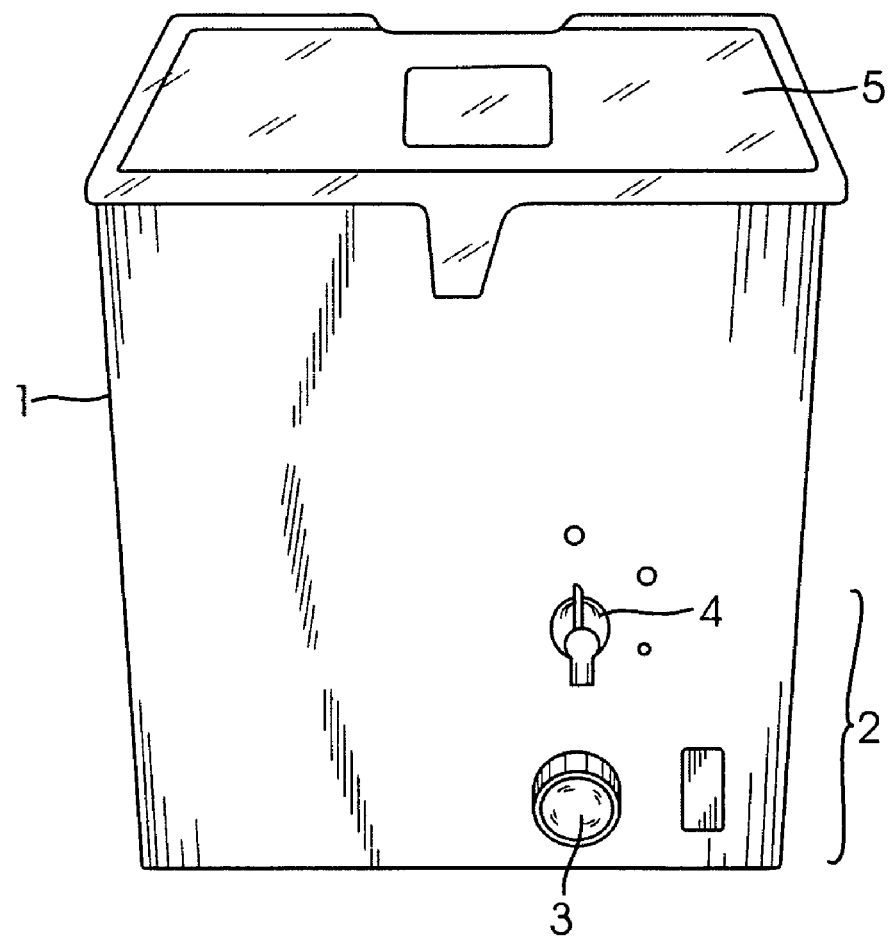
FIG. 4D shows a view of the apparatus with the lid closed in preparation of operation mode.

In FIG. 4D the apparatus is shown with the lid 5 closed, resulting in the compact disc coming into contact with the abrasive pad (not shown in FIG. 4D). The exterior housing I encloses the compact disc and moving components of the apparatus. The user controls the time in which the apparatus runs through the control panel 2. With the lid closed the motor may be powered on so that the abrasive pad continuously rotates in a horizontal direction against the compact disc being repaired. The power switch 3 allows the user to power the motor on or off. The dial 4 allows for the setting of time in which the abrasive pad rotates against the compact disc, with deeper surface scratches on compact disc requiring longer resurfacing times.

With respect to the above description, it is to be realized that the optimum dimensional relationships for the parts of the invention, to include variations in size, materials, shape, form, function, manner, color, and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, while still falling within the spirit and scope of the invention.

The invention claimed is:

1. A apparatus for repairing compact discs comprising:
an exterior housing having an upper lid rendered with an upper lid shaft connected to said lid by spring;
an arm unit attached to said lid and a joint whereby said arm unit allows for movement of the arm unit in relation to the lid;
a plate means operably attached to said arm unit for supporting a media storage disc and secured by a removable clasp;
a shaft portion connected to a motor for rotation of said shaft located beneath the arm unit and lid to facilitate the rotation of a disc polishing means located in the exterior housing; and
a hinge means connected to said lid to allow the lowering of the lid, arm unit and media store disc to come into direct contact with the disc polishing means such that the disc polish means rests parallel to the disc polishing means.

2. The apparatus of claim 1 wherein said arm unit comprises multiple appendages.

3. The apparatus of claim 1 wherein the duration of time in which said shaft rotates may be controlled.

4. A method of repairing a compact disc employing the apparatus of claim 1 comprising the steps of:
application of a solvent on said abrasive pad;
removal of said removable clasp from said plate;
placement of a compact disc on said plate;
securing said removable clasp above the compact disc and attaching to said plate; and
powering on of said motor for a time period designated by said user.

5. The method of claim 4 wherein said abrasive pad is an abrasive sheet of material.

6. An apparatus for repairing compact discs comprising:
an exterior housing having an upper lid rendered with an upper lid shaft connected to said lid by a spring;
an arm unit having multiple appendages attached to said lid and a joint whereby said arm unit allows for movement of the arm unit in relation to the lid;
a plate means operably attached to said arm unit for supporting a media storage disc and secured by a removable clasp;
a shaft portion connected to a motor for rotation of said shaft located beneath the arm unit and lid to facilitate the rotation of a disc polishing means located in the exterior housing;
a hinge means connected to said lid to allow the lowering of the lid, arm unit and media store disc to come into direct contact with the disc polishing means such that the disc polish means rests parallel to the disc polishing means; and
a dial to control the time the rotating means rotates against the media storage disc having a light indicators to determine the status of the motor.

\* \* \* \* \*